July 12, 1955
H. F. PETERSON
2,712,722
HAY RAKE TRIPPING ATTACHMENT
Filed April 13, 1954
2 Sheets-Sheet 1
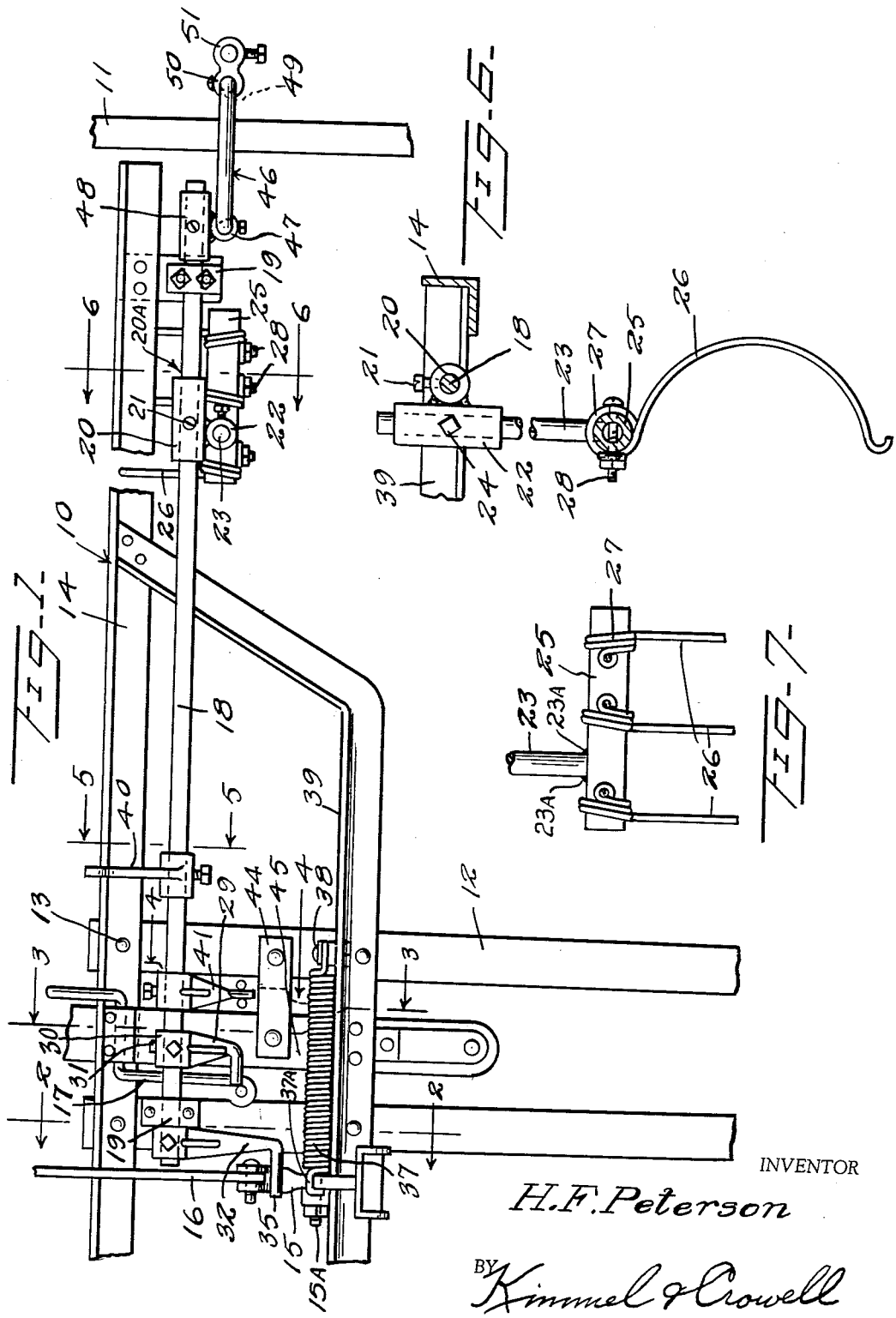
INVENTOR
H. F. Peterson
BY Kimmel & Crowell
ATTORNEYS

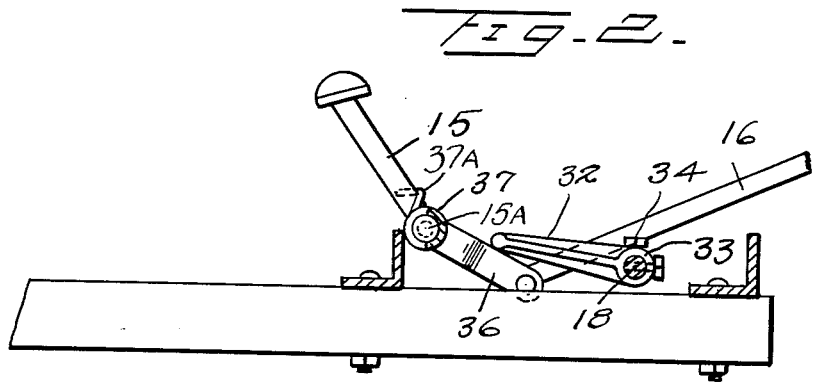
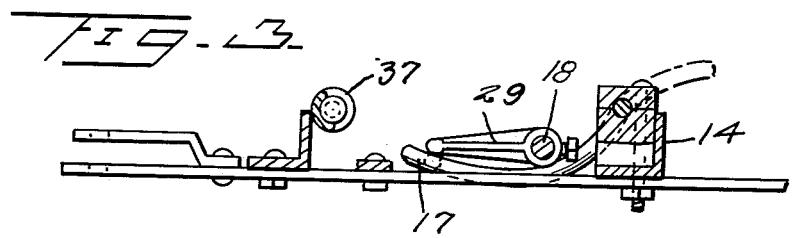
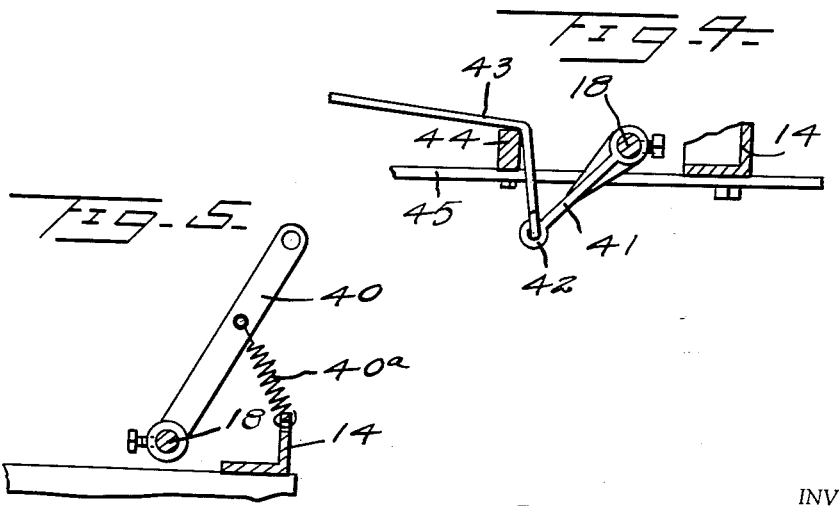

United States Patent Office 2,712,722
Patented July 12, 1955

2,712,722
HAY RAKE TRIPPING ATTACHMENT
Hugo F. Peterson, Wessington Springs, S. Dak.

Application April 13, 1954, Serial No. 422,798

1 Claim. (Cl. 56—386)

This invention relates to hay rakes.

An object of this invention is to provide in a hay rake an automatically operable means for dumping the rake to form a windrow.

Another object of this invention is to provide as an attachment for hay rakes, means for automatically dumping the rake, the attachment including means whereby the dumping operation may be manually prevented so as to thereby set up a new windrow.

A further object of this invention is to provide in a hay rake, an automatically operable tripping means for the rake which may optionally be positioned in front of the rake between the wheels, or may be positioned outside of the wheels.

With the above and other objects in view, my invention consists in the arrangement, combination and details of construction disclosed in the drawings and specification, and then more particularly pointed out in the appended claim.

In the drawings:

Figure 1 is a fragmentary plan view of a hay rake having mounted thereon a rake tripping means constructed according to an embodiment of this invention.

Figure 2 is a fragmentary sectional view taken on the line 2—2 of Figure 1.

Figure 3 is a fragmentary sectional view taken on the line 3—3 of Figure 1.

Figure 4 is a fragmentary sectional view taken on the line 4—4 of Figure 1.

Figure 5 is a fragmentary sectional view taken on the line 5—5 of Figure 1.

Figure 6 is a fragmentary sectional view taken on the line 6—6 of Figure 1.

Figure 7 is a fragmentary front elevation of the operator for the tripping mechanism.

Referring to the drawings, the numeral 10 designates generally a conventional rake frame structure which is of the type embodied in Patent No. 1,832,746, issued November 17, 1931. The frame structure 10 is mounted on a pair of wheels one of which is indicated at 11, and a pair of forwardly projecting tongues 12 are secured by fastening means 13 to the transverse horizontal frame bar 14.

As disclosed in the Patent 1,832,746, a foot operated pedal 15 is connected by means of a link 16 to a hand lever (not shown), and the tripping mechanism is actuated by means of a foot lever 17.

In order to provide a means whereby the trip lever 17 may be actuated to effect release of the hay gathered by the tines of the rake, I have provided a horizontally disposed shaft 18 which is journalled in bearings 19 carried by the frame 10.

The shaft 18 is disposed forwardly of the transverse frame bar 14, and shaft 18 has secured thereto a sleeve 20, as at 20a, which is disposed adjacent one side of the rake forwardly of the tines. The sleeve 20 is secured to the shaft 18 by means of a set screw 21.

A vertically disposed sleeve 22 is fixed relative to the horizontal sleeve 20 and a vertically disposed shank 23 is secured by means of a set-screw 24 in the vertical sleeve 22.

The shank 23 has fixed, as by welding 23a or the like to the lower end thereof, a horizontal member 25, and a plurality of arcuate teeth 26 having upper coils 27 through which the horizontal member 25 engages, are secured to the horizontal member 25 by means of bolts 28.

In practice, there are three of these tines or teeth 26 which are in advance of the conventional rake teeth and are disposed closely adjacent the wheels 11.

In order to provide a means whereby upon rocking of shaft 18 by engagement of the teeth 26 with a quantity of hay such as in the windrow, the tripping lever 17 will be rocked to rake dumping or tripping position, I have provided an L-shaped tripping member 29 which is formed with a bushing 30 through which the shaft 18 engages.

The tripping lever 29 is secured to shaft 18 by means of a set screw 31. The pedal 15, to which link 16 is pivotally connected, is adapted to be rocked downwardly at its lower end by means of an L-shaped lever 32 having a bushing 33 secured by fastening means 34 to shaft 18. The right angle arm 35 of lever 32 engages the lower arm 36 of pedal 15, as shown in Figure 2.

A tensionable spring 37 is secured at one end 37a to pedal 15 with said spring 37 mounted coaxially with the pivot 15a of the pedal 15 and is secured at the other end as at 38 to a forward frame bar 39. Spring 37 is adapted to be wound about its axial center by rotation of rock pedal 15 clockwise and spring 37 will bias pedal 15 in a counterclockwise direction, as viewed in Figure 2.

Shaft 18 also has fixed thereto an upwardly and rearwardly directed lever 40 with which a rope or flexible member is adapted to be connected and extended to the tractor whereby the tripping member 29 may be rocked to trip the rake for starting a new windrow at any predetermined location. Lever 40 is returned to normal position by means of a spring 40a.

When it is desired to hold rake against being tripped by the tripping means hereinbefore described, the shaft 18 may be held against rotation by means of a lever 41 which is secured to shaft 18. Lever 41 has an eye 42 at its free end and, as shown in Figure 4, lever 41 is downwardly directed.

One end of a cable or rope 43 is engaged with eye 42 and the cable or rope 43 is then extended upward and over crossbar 44 which is secured to a tongue 12 and drawbar 45.

In the event the windrow is beyond a wheel 11 the rake may be tripped by means of an inverted U-shaped bar 46 which is secured to a vertically disposed bushing 47 carried by a sleeve 48. Sleeve 48 is mounted on and fixed to shaft 18. The depending leg 49 of U-shaped member 46 has a vertically disposed sleeve 50 secured thereon, and a second vertically disposed sleeve 51 is secured to sleeve 50 and is adapted to receive the shank 23.

In the use and operation of this invention, as the rake is moved forwardly and picking up hay, the teeth 26 will also gather a quantity of hay, and when the rake and the teeth 26 of the tripping structure are substantially filled with hay rearward drag of the teeth 26 will cause shaft 18 to rock forwardly in a counterclockwise direction, as viewed in Figure 6.

Tripping member 17 will be rocked downwardly to trip the rake and effect release of the material therefrom, as set forth in Patent 1,832,746, supra.

In the event a new windrow is to be formed, the rake may be tripped at any desired location by pull on lever 40. In the event it is desired to hold the rake against tripping on the action of the tripping teeth 26, shaft 18 may be manually held against rotation by holding cable or rope 43.

The tripping structure hereinbefore described is designed as an attachment for rakes of the type shown in prior Patent 1,832,746, or similar types of rakes.

While this invention as herein set forth has been illustrated and described as being in conjunction with a hay rake it will be understood that the invention is not necessarily restricted to hay rakes, but is broad enough in scope to encompass other machinery, and it is intended that the invention shall be so constructed, the term "hay rake" being used herein merely as a term of art.

What is claimed is:

In a hay rake of the type having a frame, a dumpable rake, and means normally manually actuated mounted on said frame for effecting dumping of the rake, a trip mechanism for automatically actuating said means for effecting dumping of the rake comprising: a horizontal shaft rotatably mounted on said frame, a tubular sleeve horizontally slidable on said shaft, means releasably securing said sleeve to said shaft, a second sleeve integrally secured to said first sleeve with the axes of said sleeves disposed at right angles, a depending shank slidably engaged in said second sleeve, means releasably securing said shank in said sleeve, a horizontal crossbar fixed to the lower end of said shank, a plurality of tines carried by said crossbar, and a right angularly projecting lever fixed to said shaft and engageable with said manually operable means for effecting operation of the latter when a predetermined amount of hay has been picked up by said tines.

References Cited in the file of this patent

UNITED STATES PATENTS

| | | |
|---|---|---|
| 860,380 | Hogen | July 16, 1907 |
| 2,502,276 | Porter | Mar. 28, 1950 |
| 2,548,083 | Uthaug | Apr. 10, 1951 |